United States Patent [19]

Hattangadi et al.

[11] Patent Number: 5,121,350
[45] Date of Patent: Jun. 9, 1992

[54] DIGITAL TONE GENERATION BASED ON DIFFERENCE EQUATIONS

[75] Inventors: Rajiv M. Hattangadi, Austin, Tex.; Mysore Raguveer, Rochester, N.Y.

[73] Assignee: Advanced Micro Devices, Inc., Sunnyvale, Calif.

[21] Appl. No.: 211,835

[22] Filed: Jun. 27, 1988

[51] Int. Cl.$^5$ .............................. G06F 1/02
[52] U.S. Cl. ............................ 364/721
[58] Field of Search ............... 364/718–721

[56] References Cited

U.S. PATENT DOCUMENTS

| | | | |
|---|---|---|---|
| 4,133,241 | 1/1979 | Niimi et al. | 364/718 |
| 4,761,751 | 8/1988 | Canniff | 364/721 |

Primary Examiner—Dale M. Shaw

[57] ABSTRACT

A method of generating pure and decaying sinusoidal waveforms is readily implemented on arithmetic processors found in telecommunications circuits. The method is based on finite-difference equations and provides a sequence of signals having a high degree of spectral accuracy compared with presently-used methods. The sequence of signals can be generated in real-time without templates (ROM-stored patterns) because the method requires only two multiplications (16,18) and one addition (12) for each signal value generated in the sequence. The method finds application in dual-tone, multi-frequency (DTMF) telephone dialing systems.

6 Claims, 6 Drawing Sheets

DIGITAL TONE GENERATION BASED ON DIFFERENCE EQUATIONS

This invention relates generally to dual-tone multi-frequency (DTMF) telephone dialing systems and, more particularly, to a method of generating pure and decaying tones suitable for use in a telecommunication integrated circuit having an arithmetic processor.

BACKGROUND OF THE INVENTION

Generation of sinusoidal waveforms is a common function of circuitry used in telecommunications. For example, dual-tone multi-frequency (DTMF) dialing signals are composed of pure sinusoidal waveforms of two different frequencies. Other uses of sinusoidal waveforms are found in such circuits; commonly required are waveforms whose amplitude decays with time.

Various techniques are employed to generate sinusoidal waveforms: dedicated digital/analog circuitry such as is employed in American Microsystems' model S25089 tone generator; memory table look-up of sine values; and triangular and trapezoidal approximations. These three methods are described in U.S. Pat. No. 4,563,548 entitled "Method and Circuit for Telephone Dialing Signal Generation" and such description is incorporation herein by reference.

The digital/analog circuitry makes use of dedicated circuits to generate sinusoidal waveforms. These dedicated circuits take up valuable die area on the integrated circuit chip. Furthermore, they are generally fixed in terms of the functions they perform because of their use of analog circuit components.

The latter two techniques are more desirable because they are typically purely digital in nature and accordingly can be programmed to perform a variety of functions. However, the memory look-up still requires dedicated read-only memory (ROM) to store sine values as well as amplitude templates for decaying waveforms. Furthermore, it is still somewhat inflexible because of the use of only selected values of amplitude information. The triangular and trapezoidal technique is considerably more flexible and efficient of die area as it can be programmed to run on an arithmetic processor usually incorporated on telecommunications chips. However, approximation of sinusoidal waveforms by straight-line segments produces undesirable harmonics in the resulting waveforms and only the fundamental frequency is correct. Additional filtering is therefore necessitated by this technique.

What is needed is a method of generating pure and decaying sinusoidal waveforms which makes full use of the arithmetic processor commonly incorporated in telecommunications integrated circuits. Thereby not requiring circuitry dedicated solely to generation of sinusoidal waveforms and producing such waveforms accurately.

SUMMARY OF THE INVENTION

A method of generating pure and decaying sinusoidal waveforms having a high degree of spectral accuracy is provided by the instant invention. The method is readily implemented on an arithmetic processor commonly found on telecommunications integrated circuits and therefore requires no additional circuitry taking up valuable die area. The method is fully programmable making no use of preselected values and is readily capable of generating both pure and decaying sinusoidal waveforms of any desired frequency and decay rate.

Initial parameter values specifying the initial phase and peak amplitude, a decay factor, and sampling and tone frequencies are used repetitively in a finite-difference equation to generate a sequence of values which closely approximates a pure or decaying sinusoidal waveform.

Because the finite-difference equation involves only two multiplications and one addition for each value generated, the method provides a faster way of generating a sequence of values than the table look-up method which requires time-consuming references to ROM for waveform and/or decay template values.

DETAILED DESCRIPTION OF A PREFERRED EMBODIMENT

The waveform generation method of the present invention is based on the finite-difference equation:

$$y(n) = a_1 \cdot y(n-1) + a_2 \cdot y(n-2) \tag{Equ. 1}$$

where y(n) is the output at the nth sampling instant and $a_1$ and $a_2$ are constants that determine the rate of decay and the tone frequency. If T = sampling period, d = decay factor and $w_o = 2\pi f_o/f_s$ where $f_o$ = desired tone frequency and $f_s$ = sampling frequency 1/T, then $a_1$ and $a_2$ can be characterized as $$a_1 = bd^T \cos(w_o) \quad a_2 = -d^{2T} \tag{Equ. 2}$$

and the solution to Equ. 1 is given by $$y(n) = Ad^{Tn} \sin(w_o n + \phi) \tag{Equ. 3}$$

where A is the peak amplitude and $\phi$ is the initial phase:

$$A = \frac{\sqrt{y^2(o)d^{2T} + y^2(1) - 2d^T y(0)y(1)\cos(w_o)}}{d^T \sin(w_o)}$$

$$\phi = \tan^{-1}\left(\frac{d^T y(o)\sin(w_o)}{y(1) - d^T y(o)\cos(w_o)}\right) \tag{Equ. 4}$$

As can be seen from Equ. (3), the general solution to Equ. (1) is of a decaying sine wave having peak amplitude A and initial phase $\phi$. The sine way decays by a factor of d between successive samples.

Selection of the parameters A, $\phi$, d, $w_o$ and T, permits the initial values of y(0) and y(1) to be determined via equations (2) and (4). In general, the values for y(0) and y(1) are given by $$y(0) = A \sin \phi \quad y(1) = Ad^T \sin(w_o + \phi) \tag{Equ. 5}$$

For instance, the easily-implemented case of zero initial phase and peak amplitude A leads to $y(0)=0$ and $y(1)=Ad^T\sin(w_o)$. If the general form of the decaying sine wave is $F(t)=Ae^{-bt}\sin(w_o t = \phi)$ then $$d^T = e^{-bT} \text{ and } d = e^{-b} \quad \text{(Eq. 6)}$$

Figure 1:
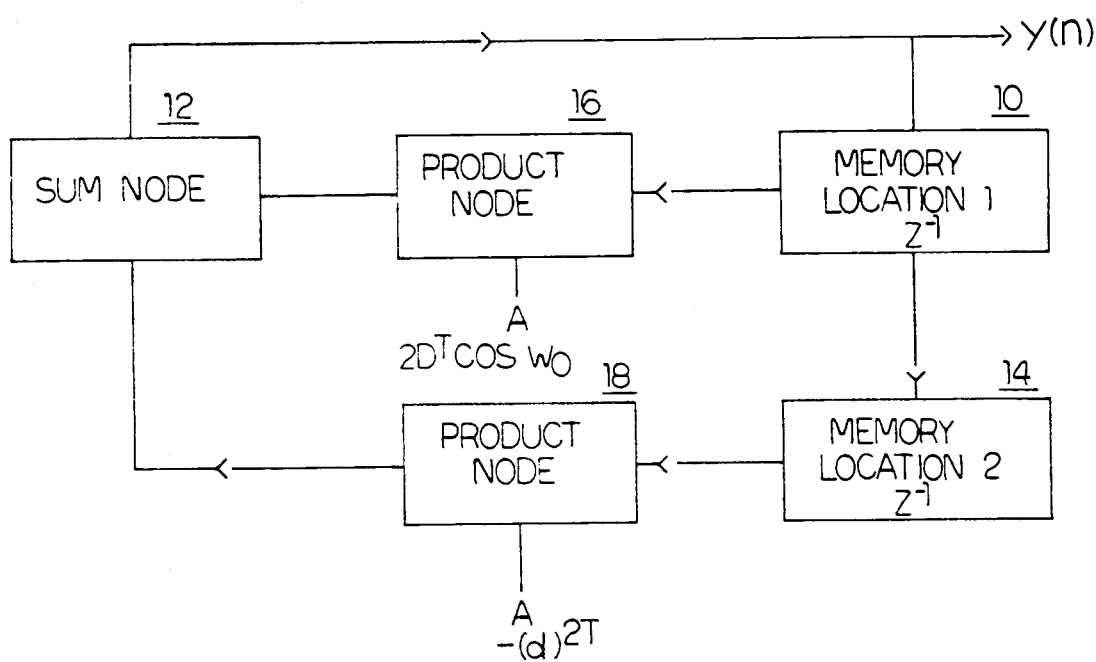
FIG. 1 is a signal flow diagram of the waveform generating method of the present invention.

FIG. 1 is a signal flow diagram illustrating the generation of tones according to the instant invention. Those familiar with the art will recognize that such a signal flow diagram is readily implemented by a programmable digital arithmetic processor such as is commonly incorporated onto telecommunications integrated circuits. A delay block 10 receives the signal generated by a sum node 12. Initially block 10 will store the initial value y(1). The signal generated by block 10 is received by a delay block 14 and a product node 16. Initially block 14 will store the initial value y(0). A product node 18 receives the signal generated by block 14.

Product node 16 also receives a signal representing the value $2(d)^T\cos(w_0)$ and product node 18 likewise receives a signal representing the value $-(d)^{2T}$. The signals generated by product nodes 16 and 18 are received by the sum node 12.

Sum node 12 generates the signal representing the current output value y(n). A digital signal processor can readily implement the signal flow diagram of FIG. 1 and generate the series of values y(n); one each sampling period.

Figure 2A:
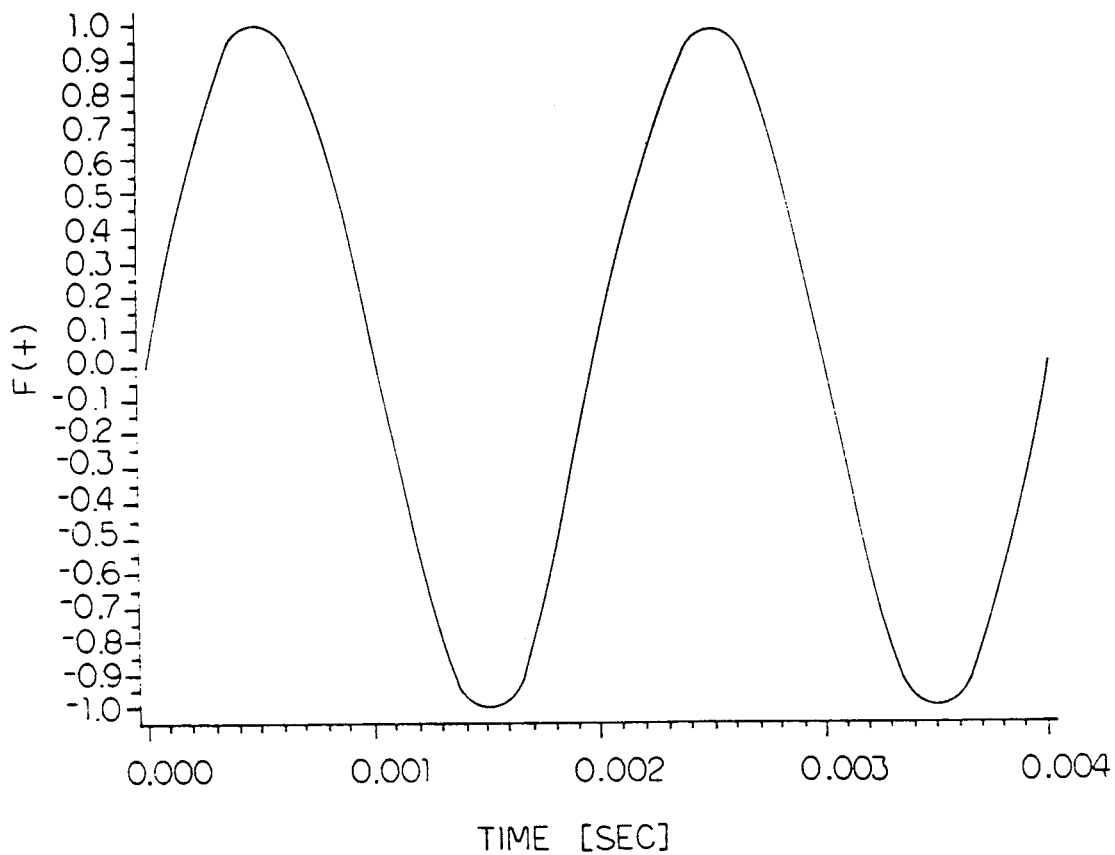
FIG. 2A and 2B illustrate a typical sinusoidal waveform as generated by the instant invention and the spectral power of the waveform, respectively.
Figure 2B:
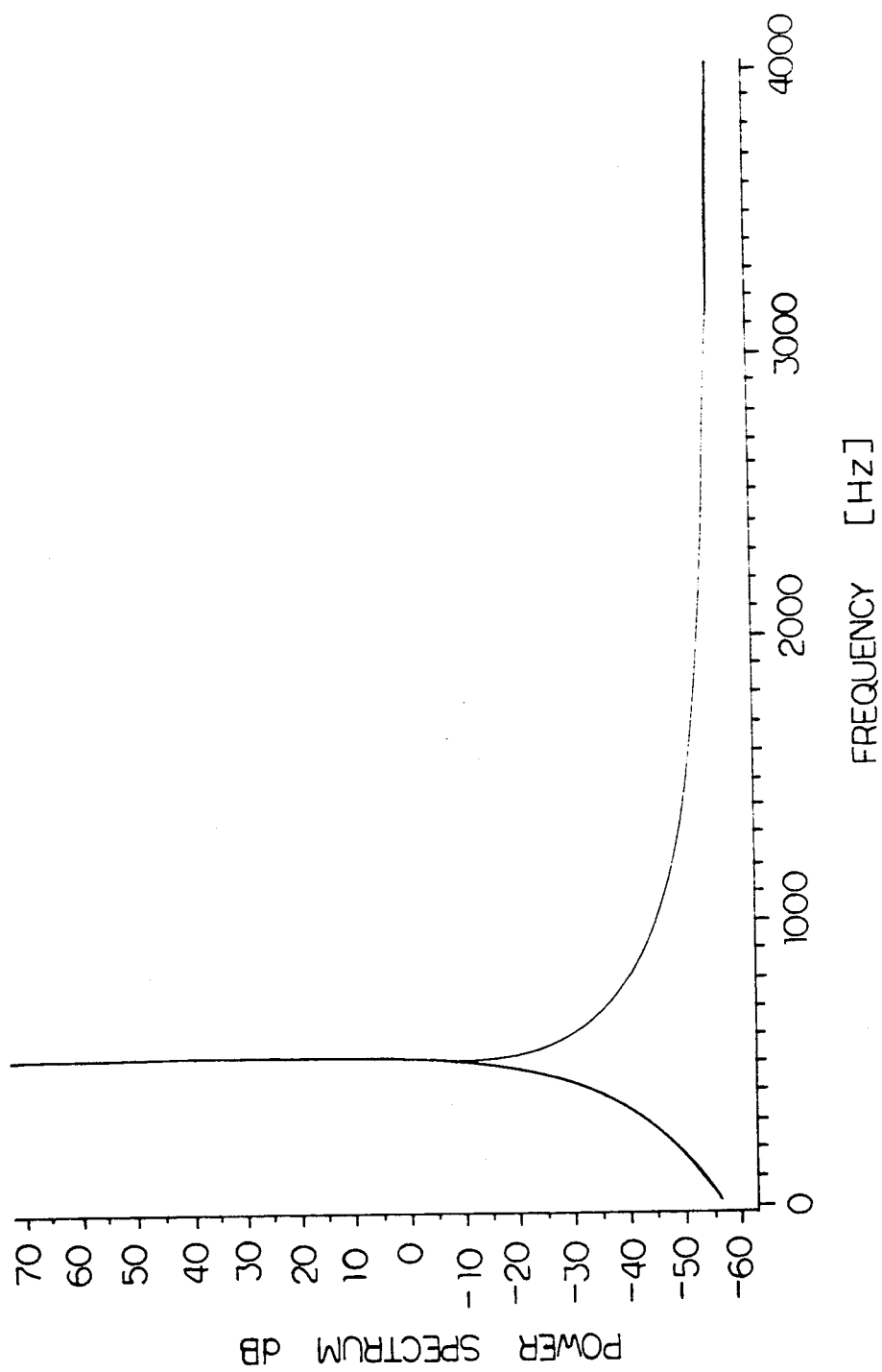
Figure 3A:
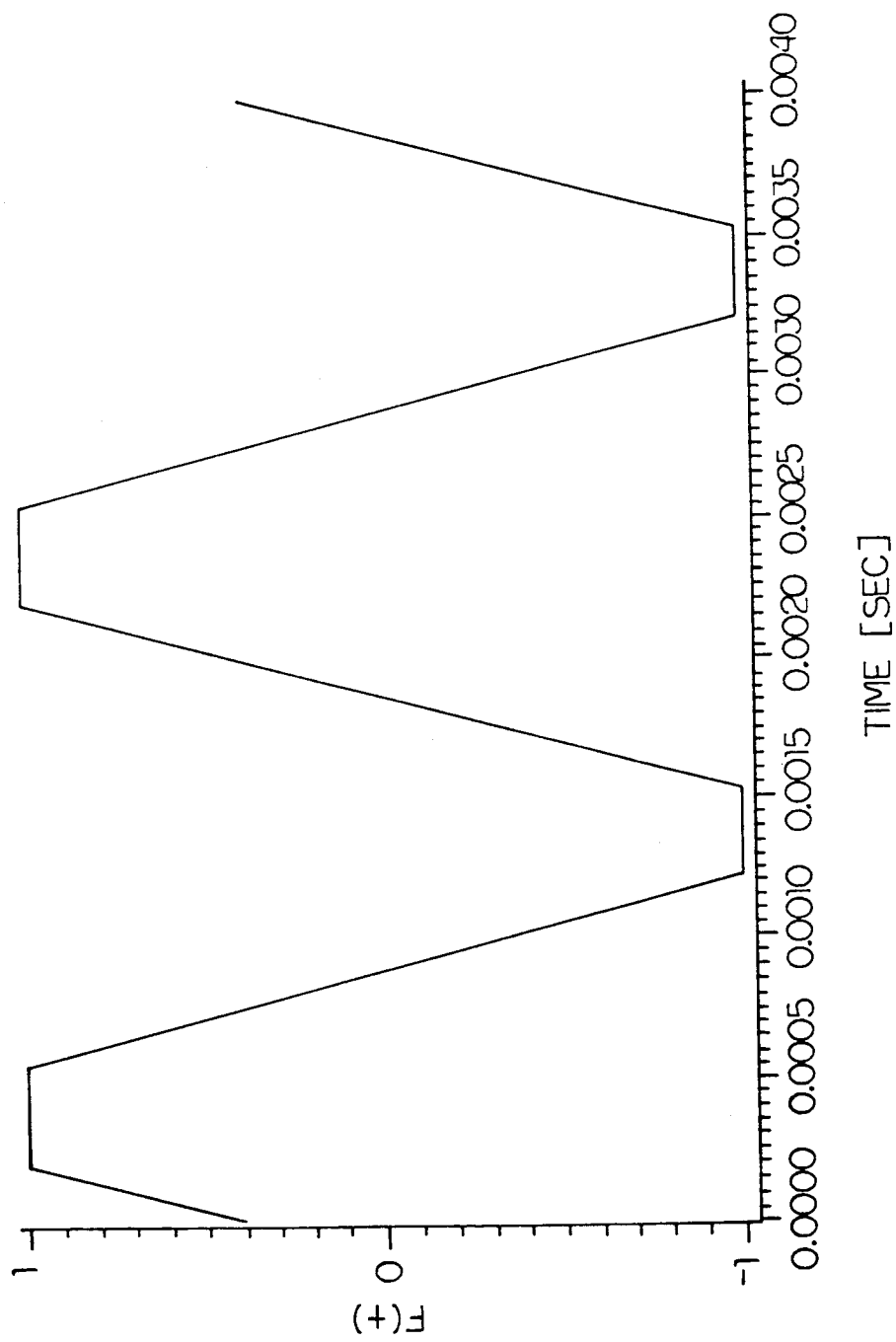
FIG. 3A and 3B illustrate a typical sinusoidal waveform as generated by a trapezoidal method and the spectral power of the waveform, respectively.
Figure 3B:
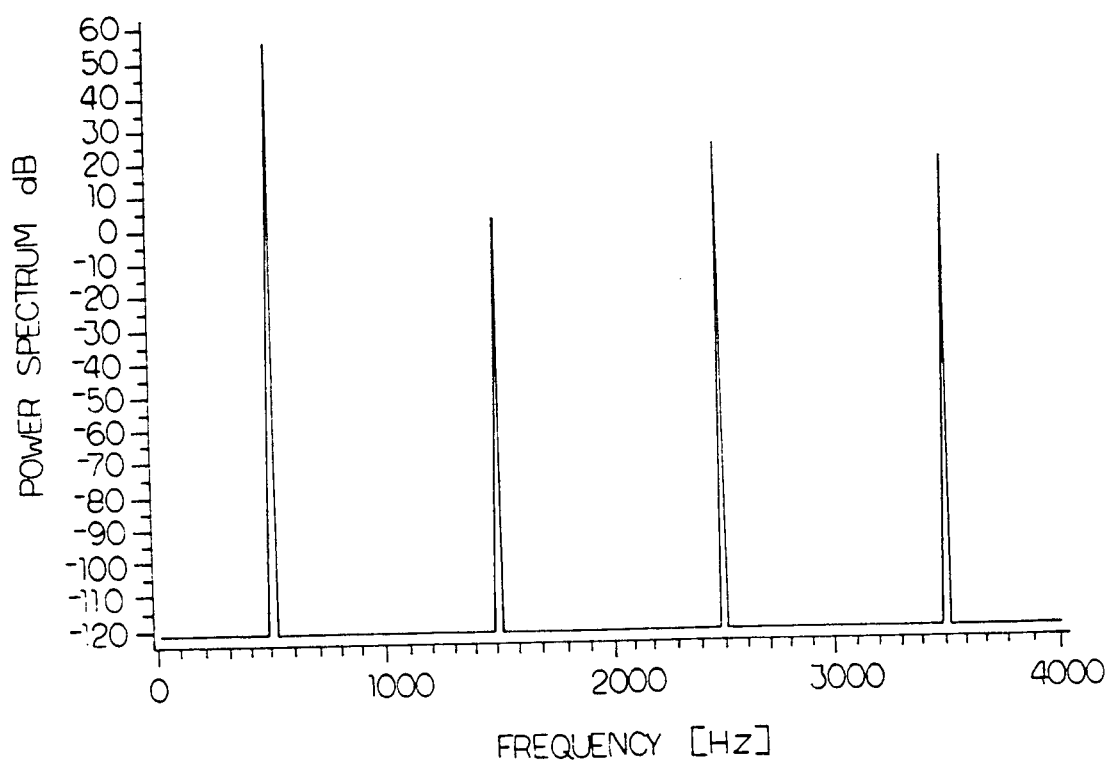

With reference now to FIG. 2, a 500 Hz waveform as generated by the instant invention, at a sampling frequency of 8 KHz, is shown in FIG. 2A. The spectral power as a function of frequency of the waveform shown in FIG. 2A is shown in FIG. 2B. For comparison, the same waveform, as generated by the trapezoidal method described in U.S. Pat. No. 4,563,548 is shown as FIG. 3A and the spectral power for this waveform is shown in FIG. 3B.

As can be seen in FIG. 2A, the waveform generated by the instant invention is virtually indistinguishable from a true sinusoidal pattern and with reference to FIG. 2B its power is almost exclusively at 500 Hz. Very little power is contained at other frequencies. The trapezoidal waveform of FIG. 3A only roughly corresponds to a true sinusoidal pattern. The result is that the power spectrum shown in FIG. 3B indicates significant power spikes at odd harmonics of the fundamental frequency, i.e., 1500 Hz, 2500 Hz, 3500 Hz, and this means that filtering will be required to remove those unwanted odd harmonics.

Figure 4:
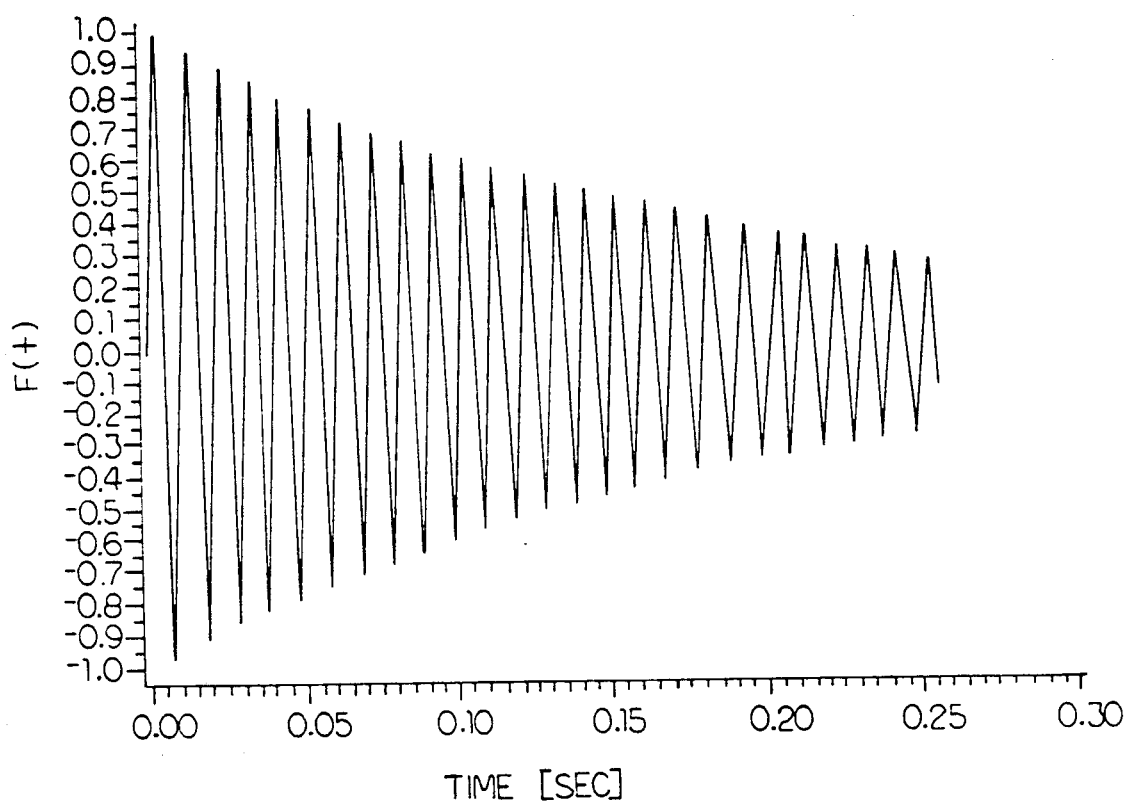
FIG. 4 illustrates a typical decaying sinusoidal waveform as generated by the instant invention.

FIG. 4 is an illustration of a decaying 500 Hz waveform, the equation of which is given by $F(t)=e^{-5t}\sin(2\pi 100 t)$, produced by the instant invention with a decay factor $d^T 0.9993751$, and a sampling frequency of 8 KHz.

We claim:

1. A method of generating a sequence of electrical digital signals y(n), n = 0, 1, 2, ... with a programmable arithmetic digital signal processor disposed on an integrated circuit chip, in which said sequence is converted to one tone by a digital to analog converter employed by a multi-tone multi-frequency telephone dialing system and in which each said digital signal y(n) of said sequence represents a periodic sample value of an approximate sinusoidal waveform corresponding to said one tone, said waveform having a peak amplitude parameter A, an initial phase parameter $\phi$, an output frequency parameter $f_o$, a sampling frequency parameter $f_s$, and a decay factor d having a value which is selectable from a range of 0 to 1 in accordance with the desired rate of decay of said sinusoidal waveform, said method comprising the following combination of steps:

a) determining a first value for a first said digital signal y(0) and a second value for a second said digital signal y(1) in accordance with the equations, $$\phi = \tan^{-1}\left[\frac{d^T y(0)\sin w_o}{y(1) - d^T y(0)\cos(w_o)}\right] \quad (1)$$

$$A = \frac{\sqrt{y^2(0)d^{2T} + y^2(1) - 2d^T y(0)y(1)\cos(w_o)}}{d^T \sin(w_o)} \quad (2)$$

where $w_o = 2\pi f_o/f_s$ and $T = 1/f_s$, including the further steps of:

(1) selecting values for A, $\phi$, $f_o$, $f_s$, and a value for d between 0 and 1 in accordance with said desired rate of decay, b) storing for use by said processor said first value for said first said digital signal y(0) and said second value for said second said digital signal y(1).

c) generating with three mathematical operations of said digital signal processor, each said periodic sample value y(n) after said second digital signal y(1), by calculating the equation $$y(n) = a_1 y(n-1) = a_2 y(n-2). \quad (3)$$

where $a_1$ and $a_2$ are constants predetermined by the equations $$a_1 = 2d^T \cos(w_0), \text{ and} \quad (4)$$

$$a_2 = -d^{2T} \quad (5)$$

and, d) transmitting said sequence of electrical signals from said signal processor to said digital to analog converter of said multi-tone multi-frequency telephone dialing system, and e) converting with said converter said sequence to said one tone.

2. A method of generating a sequence of signals y(n) according to claim 1 in which said step a) (1) of selecting includes the further step of, selecting a value of unity (1) for said decay factor d to cause said processor to generate said sequence to approximate a sinusoidal waveform that is non-decaying.

3. A method of generating a sequence of electrical digital signals y(n), n = 0, 1, 2, ... with a programmable arithmetic digital signal processor disposed on an integrated circuit chip, in which said sequence is converted to one tone by a digital to analog converter employed by a multi-tone multi-frequency telephone dialing system and in which each said digital signal y(n) of said sequence represents a periodic sample value of an approximate decaying sinusoidal waveform corresponding to said one tone, said waveform having a peak amplitude parameter A, an initial phase parameter $\phi$, an output frequency parameter $f_o$, a sampling frequency parameter $f_s$, and a decay factor d, said method comprising the following combination of steps:

a) storing for use by said processor a first digital value for said first said digital signal y(0) and a second digital value for said second said digital signal y(1) where said digital value for y(0) and said digital value for y(1) are related to the values of said parameters A and $\phi$ by the equations $$y(0) = A \sin \phi, \text{ and} \qquad (1)$$

$$y(1) = A\, d^T \sin(w_0 + \phi) \qquad (2)$$

where $$w_0 = 2\pi f_o/f_s, \text{ and}$$

$$T = 1/f_s, \text{ and}$$

said step of storing including the further steps of;
(1) selecting values for A, $\phi$, $f_o$, $f_s$, and a value for d which is less than 1, and
(2) determining said first and second digital values in accordance with equations (1) and (2), c) generating a digital value for each said digital signal y(n) of said sequence subsequent to y(1) with said digital signal processor by processing therein the equation $$y(n) = a_1 y(n-1) - a_2 y(n-2), \qquad (3)$$

where $a_1$ and $a_2$ are constants predetermined by the equations $$a_1 = 2d^T \cos(w_0), \text{ and} \qquad (4)$$

$$a_2 = -d^{2T} \qquad (5)$$

d) transmitting said sequence of electrical signals from said signal processor to said digital to analog converter of said multi-tone multi-frequency telephone dialing system, and
e) converting with said converter said sequence to said one tone.

4. The method set forth in claim 3 in which said decaying sinusoidal waveform corresponds to the function $$F(t) = Ae^{-bt}\sin(w_0 t + \phi)$$

where $t = nT$ and where said decay factor $d = e^{-b}$
where the exponent b is a predetermined constant greater than 0, including the further step of,
a) selecting the value of said exponent b in accordance with the desired rate of decay of said sinusoidal waveform.

5. A method of generating a sequence of electrical digital signals y(n), n = 0, 1, 2, ... with a programmable arithmetic digital signal processor disposed on an integrated circuit chip, in which said sequence is converted to one tone by a digital to analog converter employed by a multi-tone multi-frequency telephone dialing system and in which each said digital signal y(n) of said sequence represents a periodic sample value of an approximate decaying sinusoidal waveform corresponding to said one tone, said waveform having a preselected decay factor d, a preselected frequency parameter $f_o$, and a preselected sampling frequency parameter $f_s$, said method generating a different one of said signals once every T seconds and comprising the steps:
a) multiplying with said digital signal processor the digital value of a most recently generated signal y(n−1) and the value for $2d^T$ (cos $w_0$) where $w_0 = 2\pi f_o f_s$ to form a first product,
b) multiplying with said digital signal processor the digital value of a next most recently generated signal y(n−2) and the value for $-(d)^{2T}$ to form a second product,
c) summing said first and second products to produce a resulting value for said periodic sample y(n) of said sequence,
d) transmitting said sequence of electrical signals from said signal processor to said digital to analog converter of said multi-tone multi-frequency telephone dialing system, and
e) converting with said converter said sequence to said one tone.

6. The method set forth in claim 5 wherein said decaying sinusoidal waveform has an initial amplitude A and an initial phase $\phi$, wherein a first signal y(0) = A sin $\phi$ and a second signal y(1) = $Ad^T \sin(w_0 + \phi)$ and wherein said digital signal processor includes first and second storage locations for storing signals y(n) including the further steps of,
a) initially loading said first storage location with a value corresponding to said first signal y(0) and loading said second storage location with a value corresponding to said second signal y(1).

* * * * *